United States Patent [19]
Buyens

[11] Patent Number: 5,383,443
[45] Date of Patent: Jan. 24, 1995

[54] DIAMOND WIRE SAWS

[76] Inventor: Marc O. R. G. Buyens, 14 Mann Street, Riebeeckstad, Orange Free State, South Africa

[21] Appl. No.: 41,229

[22] Filed: Mar. 31, 1993

[30] Foreign Application Priority Data

Mar. 31, 1992 [ZA] South Africa ............ 92/2337

[51] Int. Cl.⁶ .................................. B28D 1/08
[52] U.S. Cl. .......................... 125/21; 125/22
[58] Field of Search ............... 125/12, 21, 22

[56] References Cited

U.S. PATENT DOCUMENTS

| | | | |
|---|---|---|---|
| 2,451,383 | 10/1948 | D'Avaucourt | 125/21 |
| 3,661,137 | 5/1972 | Prowse et al. | 125/21 |

FOREIGN PATENT DOCUMENTS

| | | | |
|---|---|---|---|
| 0336253 | 10/1989 | European Pat. Off. | 125/21 |
| 1964392 | 7/1971 | Germany | 125/21 |
| 2014437 | 10/1971 | Germany | 125/21 |
| 46-18553 | 5/1971 | Japan | 125/21 |

Primary Examiner—Maurina T. Rachuba
Attorney, Agent, or Firm—Jacobson, Price, Holman & Stern

[57] ABSTRACT

The wire saw has a wire and a plurality of abrasive beads mounted in spaced apart relationship on the wire. Contrary to normal practice, the beads are mounted eccentrically on the wire. In some versions of the invention, one bead is rotationally off-set from the neighbouring beads.

8 Claims, 1 Drawing Sheet

DIAMOND WIRE SAWS

BACKGROUND TO THE INVENTION

THIS invention relates to wire saws, and particularly to diamond wire saws.

It has been proposed to use diamond wire saws in the mining industry to cut slots in the rock mass in a mine. The diamond wire saw itself will usually comprise a length of steel wire carrying spaced apart, diamond-impregnated beads. Researchers in this field have identified jamming of the wire saw in the slot as a major problem in the implementation of diamond wire sawing proposals. In addition to jamming, problems can also be encountered, after temporary cessation of a sawing operation, in re-threading the wire saw through the slot when sawing is to start again.

It is believed that jamming of the wire saw in the slot is attributable to three main phenomena:
1. Rock movements which give rise to slot closure. These movements may be due to the elastic behaviour of the rock or discontinuities such as faults, joins and stress fractures in the rock mass.
2. Entrainment by the wire saw of rock fragments which can cause jamming because of the close tolerance between the beads and the slot.
3. Failures in the jointing of the wire saw itself. With the saw being under substantial tension during sawing, any failure of this type can cause the wire to spring back into a previously cut part of the slot where some closure has already taken place and where jamming is possible.

Whatever the cause of a jam, the only technique presently available to free the wire for resumption of sawing is conventional mining of the rock mass in which the saw is jammed. This is however time consuming and not always successful. In addition, conventional mining may damage the jammed wire saw.

An object of the present invention is to reduce the risk of the wire saw jamming in the slot.

SUMMARY OF THE INVENTION

A first aspect of the invention provides a wire saw comprising a wire and a plurality of abrasive beads mounted in spaced apart relationship on the wire, wherein the beads are mounted eccentrically on the wire.

Typically, the wire passes through off-centre holes in the beads.

Preferably at least some of the beads on the wire are rotationally off-set with respect to other beads on the wire. In one embodiment each bead is rotated through 90° relative to the neighbouring beads.

In other embodiments, the wire is a multi-strand wire passing through off-centre holes in the beads, the holes being shaped to accommodate the outer profile of the wire. The wire in one arrangement has a plurality of external strands at least one of which is of greater diameter than others of the external strands.

Conveniently, only those regions of the beads which are furthest from the wire are impregnated with diamonds.

A second aspect of the invention provides an abrasive bead for use in a wire saw, the bead being formed with an eccentrically positioned hole adapted to receive a wire of the wire saw.

BRIEF DESCRIPTION OF THE DRAWINGS

The invention will now be described in more detail, by way of example only, with reference to the accompanying drawings in which.

DESCRIPTION OF THE DRAWINGS

Figure 1:
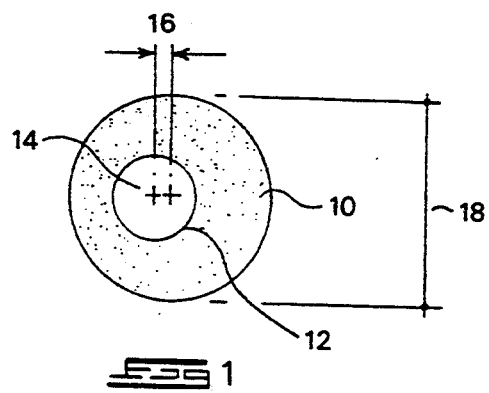
FIG. 1 shows a diagrammatic cross-sectional view of a wire saw and illustrates the principles of the invention.

FIG. 1 shows a cross-section view of a diamond wire saw at a position where a diamond-impregnated bead 10 includes a hole 12 through which a wire 14 passes. It will be noted that the bead is eccentrically mounted on the wire, the eccentricity being indicated with the numeral 16. The nominal bead diameter is indicated with the numeral 18.

As mentioned above, it is proposed to mount the beads 10 on the wire in such a manner that the eccentricities of the beads are angularly displaced from one another. In practice, this can be achieved by angularly indexing each successive bead 10 through a predetermined angle with respect to the preceding bead 10.

Figure 2:
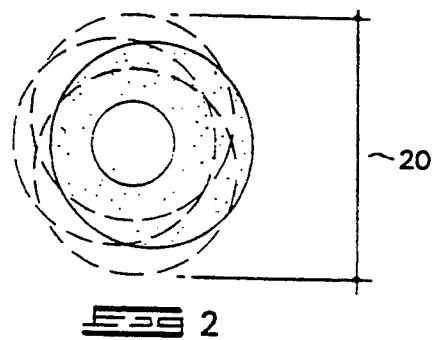
FIG. 2 illustrates how, with a wire saw of the invention, a slot can be cut which has a width greater than the nominal bead diameter.

FIG. 2 diagrammatically illustrates a situation in which successive beads are angularly indexed, i.e. rotated, through successive angles of 90°. In other words, starting from a first bead, the next or second bead is rotated by 90° relative to the first bead, the third bead is rotated by 180° relative to the first bead and 90° relative to the second bead) and so on. The angular orientation of the fifth bead will match that of the first bead.

In FIG. 2, successive beads are shown superimposed upon one another to illustrate that the width 20 of a slot that is cut with the beaded wire saw is greater, by twice the eccentricity 16, than the nominal diameter 18 of the individual beads. This is because with the wire saw moving longitudinally relative to a rock mass which is to be sawed, successive beads attack portions of the rock that are unaffected by the immediately preceding beads.

It is believed that the greater slot width that can be cut with an arrangement such as that depicted diagrammatically in FIGS. 1 and 2 can reduce the risk of the wire saw jamming in the slot even if a small amount of slot closure takes place.

Figure 3:
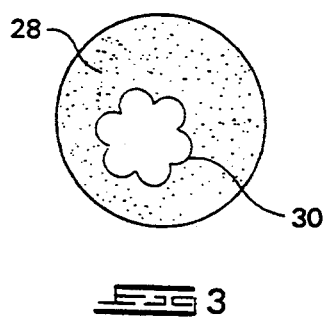
FIGS. 3 and 3A together illustrate another embodiment in a diagrammatic cross-sectional view.
Figure 3A:
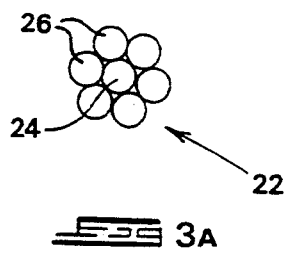

FIG. 3A shows the cross-section of a multi-strand wire 22 which has a central core 24 and six external strands 26. FIG. 3 shows a bead 28 which is formed with an eccentric wire-receiving hole 30 shaped to match the external profile of the wire 22.

Figure 4:
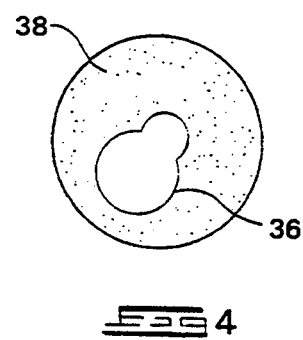
FIGS. 4 and 4A together illustrate yet another embodiment in a diagrammatic cross-sectional view.
Figure 4A:
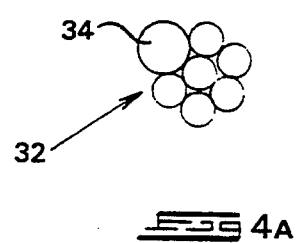

FIG. 4A shows the cross-section of a multi-strand wire 32 which differs from the wire 22 in that one of the external strands 34 is of larger diameter than the remaining external strands. In FIG. 4, the wire receiving hole 36 in the bead 38 is shaped to accommodate the irregular external wire profile.

The external strands in FIGS. 3A and 4A are arranged in spiral form about the respective wire cores. With this arrangement, regular angular indexing of successive beads can be achieved without difficulty, particularly in the case of FIGS. 4 and 4a.

In practice, angular indexing is achieved merely by ensuring that the same strand-receiving recess in the hole 30, 36 receives the same strand at each bead position.

It will also be understood that the rotational off-set of one bead relative to the next bead will be determined by the axial distance between those beads. The beads may in practice be spaced apart on the wire by spacers, typically in the form of a tubular spring or plastics sleeve, and in such cases, the length of each spacer situated between two beads will determines the rotational off-set of one bead relative to the other.

Figure 5:
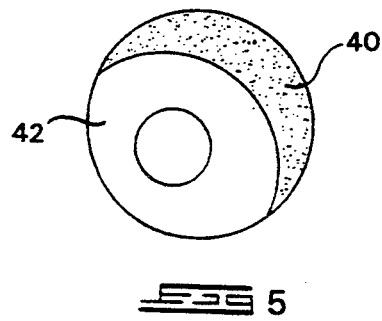
FIG. 5 illustrates a further embodiment, once again in a diagrammatic cross-sectional view.

A further important feature of the invention arises from the fact that only that region of the periphery of a bead which is furthest from the wire receiving hole serves a cutting function. Those peripheral regions of the bead which are closer to the hole will not usually contact the rock because of the cutting action of the preceding beads. With a view to limiting the costs of the wire saw, it is therefore proposed to impregnate only the working region of each bead with diamond. This is illustrated in FIG. 5, in which the diamond impregnated region is indicated with the numeral 40 and the non-impregnated region is indicated with the numeral 42.

In each of the beads illustrated in the drawings, diamond particles are embedded in a suitable substrate such as steel or a carbide material. In each case, the bead may be anchored on the wire by a vulcanising process. The wire itself can be made of any suitable material such as steel.

I claim:

1. A wire saw comprising a single wire and a plurality of beads mounted in spaced apart relationship on the wire, the wire passing through an off-centre hole extending through each bead so that each bead completely surrounds the wire in an eccentric manner, and at least some of the beads being rotationally offset with respect to the other beads.

2. The wire saw according to claim 1 wherein each bead is rotated through 90° relative to the neighboring beads.

3. The wire saw according to claim 1 wherein the wire is a multi-strand wire passing through the off-centre holes in the beads, the holes being shaped to accommodate the outer profile of the wire.

4. A wire saw according to claim 3 wherein the wire has a plurality of external strands at least one of which is of greater diameter than others of the external strands.

5. A wire saw according to claim 1 wherein at least a portion of the periphery of each bead is impregnated with diamonds.

6. A wire saw according to claim 5 wherein only those regions of the beads which are furthest from the wire are impregnated with diamonds.

7. An abrasive bead for use in a wire saw, the bead being formed with a single eccentrically positioned hole adapted to receive a wire of the wire saw wherein the hole is shaped to accommodate the outer profile of a multi-strand wire of the wire saw, at least one of the strands of the wire being of greater diameter than other strands of the wire.

8. An abrasive bead according to claim 7 wherein only a portion of the periphery of the bead is impregnated with diamonds.

* * * * *